United States Patent [19]

Frick et al.

[11] 3,899,568

[45] Aug. 12, 1975

[54] ALUMINA REMOVAL FROM CHROMATE LEACH LIQUORS

[75] Inventors: Douglas G. Frick, Liverpool; Thomas R. Morgan, Solvay; Terry L. Streeter, Syracuse, all of N.Y.

[73] Assignee: Allied Chemical Corporation, New York, N.Y.

[22] Filed: June 12, 1974

[21] Appl. No.: 478,812

[52] U.S. Cl. .................... 423/55; 423/57; 423/124; 423/127; 423/122; 423/128; 210/45; 210/46; 210/49; 210/56
[51] Int. Cl.² .................... C01F 7/14; C01G 37/14
[58] Field of Search .......... 423/53, 55, 56, 57, 122, 423/124, 127–129; 210/45, 46, 49, 56

[56] References Cited
UNITED STATES PATENTS

| | | | |
|---|---|---|---|
| 1,943,786 | 1/1934 | Cowles | 423/127 |
| 2,612,435 | 9/1952 | Perrin et al. | 423/127 |
| 2,839,359 | 6/1958 | Dunning | 423/53 |
| 3,137,541 | 6/1964 | Cooke | 423/57 |
| 3,440,005 | 4/1969 | Featherson et al. | 423/127 |
| 3,486,850 | 12/1969 | Day | 423/127 |

*Primary Examiner*—Herbert T. Carter
*Attorney, Agent, or Firm*—Gerhard H. Fuchs

[57] ABSTRACT

This invention relates to an improvement in the method for removing dissolved aluminate from alkaline chromate leach liquor by acidification of the leach liquor to precipitate alumina hydrate which comprises, in combination, passing the leach liquor sequentially through a series of at least two agitated vessels, maintaining the liquor at a temperature of at least about 90°C., and adding acidifying agent to said vessels in amount sufficient to establish gradually decreasing pH levels in the liquor from vessel to vessel in the direction of liquor flow such that the pH in the vessel through which the liquor passes first is maintained within the range of from 10 to 13.5, and the pH in the vessel through which the liquor passes last is maintained within the range of from 6 to 9.5, so that the precipitated alumina hydrate comprises predominantly alumina trihydrate in easily filterable form.

10 Claims, No Drawings

3,899,568

ALUMINA REMOVAL FROM CHROMATE LEACH LIQUORS

BACKGROUND OF THE PRESENT INVENTION

In the manufacture of chromates from chromium ore by the conventional alkali roasting process, chromium ore containing about 40 to 50 percent chromic oxide ($Cr_2O_3$) is dried, ground to fine particle size, mixed with alkali metal hydroxide or carbonate, usually soda ash, and the mix is roasted at temperature of about 2,000° to 2,100°F. in an oxidizing atmosphere. Usually, ground filter residue from the previous operation is also added to the mix. Choice of proportions of the components of the mix will usually depend on the furnace used and the the results desired. Alkali metal hydroxide or carbonate is usually added to supply about 90 percent of the amount of alkali metal theoretically necessary to combine with the total amount of chromic oxide present in the ore and in the filter residue. After the roasting operation, the "roast" is cooled and transferred into a series of leach vessels wherein it is countercurrently leached with water or dilute chromate liquors to obtain a nearly saturated solution of chromate leach liquor, which is then worked up to obtain the desired product, usually sodium chromate.

Chromium ore also contains appreciable amount of aluminum in chemically bound form, usually in amount equivalent to about 5 to 30 percent by weight of $Al_2O_3$. When the ore is roasted at high temperatures with the alkali metal hydroxide or carbonate, soluble aluminate is formed which in the following leaching step dissolves in the leach liquor. Thus, if soda ash was employed in the roasting operation, appreciable amounts of soluble sodium aluminate will contaminate the leach liquor. Formation of soluble aluminate will usually only be desired if alumina is to be recovered as by-product.

Formation of soluble aluminate can be substantially avoided by addition of ground lime to the roasting mix prior to roasting, to the extent of about 50 percent or more, based on the weight of the ore used. In the roasting operation the lime reacts with the aluminum to form insoluble calcium aluminate. However, even with addition of excess lime, minor but intolerable quantities of soluble aluminate sometimes are still carried into the chromate leach liquor and cause difficulties in subsequent processing steps. When leach liquor containing dissolved aluminate is acidified, as required for further work-up, the aluminate precipitates in an uncontrolled fashion, usually as a gelatinous alumina hydrate which causes severe filtration problems.

It is also known to remove soluble aluminate from chromate leach liquors by adding a chemical agent which forms an insoluble but filterable aluminate. Unfortunately, such aluminate precipitates generally have no by-product value. For example, addition of lime to the leach liquor precipitates insoluble calcium aluminate, but there is no market for this. Thus, use of lime to bind the aluminum in insoluble form merely contributes to the cost of the process, adds to disposal problems and contributes to pollution.

It is possible to conduct the roasting operation in the absence of added lime, so that the major portion of the aluminum oxide from the chromium ore is solubilized as aluminate which must then be removed from the chromate leach liquor. This can be done by precipitating it in the form of alumina hydrates by the simple expedient of acidifying the highly alkaline leach liquor. Alumina hydrates exist in several forms such as the $\alpha$-monohydrate ($\alpha$-$Al_2O_3 \cdot H_2O$) known as Boehmite, the $\beta$-monohydrate ($\beta$-$Al_2O_3 \cdot H_2O$) known as Diaspore, the $\alpha$-trihydrate ($\alpha$-$Al_2O_3 \cdot 3H_2O$) known as Gibbsite, and the $\beta$-trihydrate ($\beta$-$Al_2O_3 \cdot 3H_2O$) known as Bayerite. The major problem with removal of soluble aluminate from chromate leach liquor by acidification of the liquor is that the principal precipitate is the monohydrate, which is obtained in the form of a slimy, highly voluminous precipitate which is very difficult to filter and which tends to carry along significant amounts of chromate, thereby reducing chromate yield and alumina by-product quality. The trihydrates (Gibbsite and Bayerite) are the preferred precipitates because they are relatively easily filtered and contain less absorbed chromate. Unfortunately, however, the trihydrates are the most difficult precipitates to form in strong alkaline chromate leach liquor.

To avoid the alumina monohydrate filtration problem it has already been proposed (cf. British Pat. No. 1,057,678) to leach the chromium ore roast with an acidic leaching agent of sodium bichromate solution to precipitate alumina hydrate in the leaching operation. The alumina hydrate thus precipitated remains with the insoluble residue, from which it may subsequently be recovered by treatment of the residue with acids or bases. However, if the alumina hydrate is to be so recovered an additional step is introduced into the process. Also, we found that in this acid leaching process excessive amounts of magnesium salts are also dissolved which must be removed in subsequent process steps or else the chromate product is contaminated with magnesium.

It is an object of the present invention to provide a process by which dissolved aluminate can be removed from alkaline chromate leach liquor by precipitation predominatly in the form of readily filterable alumina trihydrate.

SUMMARY OF THE PRESENT INVENTION

In accordance with the present invention it has been discovered that when dissolved aluminate is precipitated from alkaline chromate leach liquor by acidification at high temperature of at least about 90°C. in a series of vessels by addition of acidifying agent so that the pH level of the liquor is gradually reduced as the liquor passes through these vessels, then the precipitated alumina hydrate comprises predominantly alumina trihydrate in easily filterable form. Accordingly, the present invention comprises an improvement in the process for removing dissolved aluminate from alkaline chromate leach liquor by acidification of the leach liquor to precipitate alumina hydrate which comprises, in combination: (a) passing the leach liquor sequentially through a series of at least two agitated vessels; (b) maintaining the liquor at a temperature of at least about 90°C.; and (c) adding acidifying agent to said vessels in amount sufficient to establish gradually decreasing pH levels in the liquor from vessel to vessel in the direction of liquor flow such that the pH in the vessel through which the liquor passes first is maintained within the range of from 10 to 13.5, and the pH in the vessel through which the liquor passes last is maintained within the range of from 6 to 9.5, so that the precipitated alumina hydrate comprises predominantly alumina trihydrate.

DETAILED DESCRIPTION OF THE INVENTION AND OF THE PREFERRED EMBODIMENTS

Precipitation of alumina hydrate from an alkaline sodium chromate solution by acidification, as illustrated by acidification with sodium bichromate solution, involves the following two reactions:

(I) $2NaAlO_2 + 4H_2O \rightarrow Al_2O_3 \cdot 3H_2O + 2NaOH$ (II) $2NaOH + Na_2Cr_2O_7 \rightarrow 2Na_2CrO_4 + H_2O$ In strong chromate solution the rate of hydrolysis of sodium aluminate according to Reaction I above, is very low. Neutralization of sodium hydroxide with dichromate according to Reaction II above proceeds almost instantaneously. If the rate of acidification is too fast, gelatinous alumina precipitate is formed.

We now have found process conditions under when formation of such gelatinous precipitate is readily avoided. In our process the chromate leach liquor is acidified in a series of agitated vessels (staged backmix reactors). A minimum of two vessels is required. There is no limit on the upper number of vessels employed except as dictated by practical considerations. Good agitation is employed in order to obtain good dispersion of the acidifying agent in the chromate leach liquor so as to avoid localized excessive concentration of acidifying agent. Acidifying agent is fed to each of the vessels such that the pH in the vessel through which the liquor passes first is maintained within the range of from 10 to 13.5, preferably from 12 to 13, and the pH of the vessel through which the liquor passes last is maintained within the range of from 6 to 9.5, preferably from 9 to 9.5. The pH in the intermediate vessels, if any are employed, is maintained at incrementally decreasing levels in the direction of liquor flow at a pH between that maintained in the first and last vessel.

The preferred acidifying agent is a bichromate solution. Inorganic acids generally can be employed although they are not ordinarily preferred because they tend to contaminate the chromate product. Exemplary suitable acidifying agents include sulfuric acid, phosphoric acid, hydrochloric acid and the like.

The bichromate solution will generally be obtained from a later step in the process. Suitable sodium bichromate concentration in such solution range from about 5 to about 40 percent, preferably about 5 to about 20 percent by weight, expressed as $Na_2Cr_2O_7 \cdot 2H_2O$. In general, any bichromate solution in suitable for use in the present process provided it is more acidic than the chromate leach liquor. While solutions stronger than those indicated above, including saturated solutions, can be used, we have found that desired slow acidification rates can be more easily maintained using weaker bichromate solutions containing bichromate in amount of from about 5 to about 20 percent by weight.

The average overall residence time in the series of vessels will ordinarily range from about 4 to about 12 hours, preferably from about 6 to about 10 hours, most preferably from about 7 to about 9 hours. In general, the longer residence times are preferred when stronger solutions of acidifying agent are used.

The temperature of the leach liquor in the precipitation process should be at least about 90°C., more preferably at least about 100°C. In most preferred operation the process is carried out at the temperature of the atmospheric pressure boiling point of the liquor. Temperatures above that can also be employed if the reaction is carried out under superatmospheric pressure in closed reaction vessels.

In our process the aluminate precipitates in easily filterable form predominantly in the form of the trihydrate (Gibbsite and Bayerite), by which we mean that at least 50 percent of the aluminum is present in the form of the trihydrate. Separation of the precipitate from the acidified leach liquor can readily be accomplished by usual procedure such as settling, filtration and centrifugation. The alumina trihydrate precipitate may be removed from the liquor after the liquor passes through the last vessel in the series or, optionally, as the liquor is transferred from the vessel to vessel.

It is advantageous to maintain a seed bed of alumina trihydrate in the vessels. Thus, we prefer to add alumina trihydrate in amount of 1 to 10 percent by weight, more preferably 3 to 7 percent by weight of the liquor as seed.

Experiments 1 and 2 illustrate the influence of reaction temperature on the type of precipitate formed.

EXPERIMENT 1

A chromate leach liquor containing 38 weight percent of $Na_2CrO_4$ and 4.55 weight percent $Al_2O_2$ in the form of soluble sodium aluminate, having a pH of 13.3, was charged to a 500 ml. stirred batch reactor together with 3 grams of Gibbsite as seed. The liquor was acidified to pH of 9.5 by slow addition of 248 grams of a solution containing 15.2 weight percent of $Na_2Cr_2O_7 \cdot 2H_2O$ and 39.2 weight percent of $Na_2CrO_4$ over a period of 7 hours. Throughout that period temperature of the liquor in the vessel was maintained at 26°C. The resulting slurry filtered at a rate of about 2 gallons per hour per square foot of filter area under standard test conditions at 26°C. Although Gibbsite was used for seeding, the precipitate formed was predominantly Boehmite and amorphous alumina, as determined by X-ray diffraction.

EXPERIMENT 2

Experiment 1 was repeated using 500 ml. of leach liquor containing 20 weight percent $Na_2CrO_4$ and 2.4 weight percent $Al_2O_3$ in the form of soluble sodium aluminate having pH of 13.4. Under constant agitation at atmospheric boiling temperature of 104°C. there were added 1,248 grams of a sodium bichromate solution containing 7 weight percent $Na_2Cr_2O_7 \cdot 2H_2O$ and 18 weight percent $Na_2CrO_4$ to the liquor in the agitated reactor over an 11 hour period. The resulting slurry filtered at a rate of 91 gallons per hour per square foot of filter area under standard test conditions at 26°C. The filtrate contained less than 0.002 percent dissolved aluminate, expressed as $Al_2O_3$. The precipitated alumina was identified by X-ray diffraction as 80 percent Gibbsite and 20 percent Boehmite.

The above tests demonstrates the strong influence of temperature on the type of precipitate formed in a batch reaction.

Experiment 3 and the Example provided below illustrate the strong influence of staging on the type of precipitate formed in continuous process for acidification of chromate leach liquor to precipitate alumina hydrate. In Test 3, precipitation is carried out on continuous basis in a single vessel. In the Example, precipitation is carried out on continuous basis in a series of two vessels. By use of a series of vessels filtration rate increased ten-fold.

EXPERIMENT 3

A 500 ml. stirred reactor was initially charged with 300 ml. of chromate leach liquor having pH of 13.4 containing 20 weight percent $Na_2CrO_4$ and 2.39 weight percent $Al_2O_3$ in the form of soluble sodium aluminate, together with 3 grams of Gibbsite as seed. Addition of that leach liquor was then continued at a rate of 1 ml. per minute. A bichromate solution containing 7 weight percent $Na_2Cr_2O_7.2H_2O$ and 18 weight percent $Na_2CrO_4$ was continually fed to the vessel at the rate required to maintain the pH of the liquor within the vessel at 9.5. The liquor in the vessel was maintained at boiling temperature of 102°C. throughout. Slurry was continuously withdrawn from the vessel to maintain constant liquor volume of 300 ml. The experiment was run on continuous basis for a period of 5.75 hours. The composited slurry withdrawn from the reactor had a filtration rate of 21 gallons per hour per square foot of filter area under standard test conditions at 26°C. The filtrate contained 0.006 percent dissolved aluminate, expressed as $Al_2O_3$. The alumina was identified as 80 percent Bayerite, 10 percent Gibbsite and 10 percent Boehmite.

The following Example sets forth the best mode presently contemplated for the practice of the present invention.

EXAMPLE

A chromate leach liquor having pH of 13.4 containing 20 weight percent $Na_2CrO_4$ and 2.4 weight percent $Al_2O_3$ in the form of soluble sodium aluminate was acidified in a series of two agitated vessels of 500 ml. capacity each. Leach liquor was fed to the first vessel continuously at a constant rate of 1 ml. per minute. Constant volume of 300 ml. was maintained in this vessel by overflowing excess liquor into the second vessel wherein liquor level was also maintained at a constant 300 ml. by continually withdrawing the excess. Temperature of the liquor in each vessel was maintained at the boiling point of the solution (103°C.) and acidifying liquor containing 7 weight percent $Na_2Cr_2O_7.2H_2O$ and 18 weight percent $Na_2CrO_4$ was fed continuously to each of these vessels to maintain constant pH of 12.5 in the first vessel, and constant pH of 9.5 in the second vessel. Liquor feed was continued for a total time period of 5 hours. All slurry continuously withdrawn from the first vessel was fed to the second vessel. The slurry withdrawn from the second vessel filtered at a rate of 212 gallons per hour per square foot of filter area under standard test conditions at 26°C. The alumina precipitate was identified by X-ray diffraction as 50 percent Gibbsite and 50 percent Bayerite.

Since various changes and modifications may be made in the invention without departing from the spirit and essential characteristics thereof, it is intended that all matter contained in the above description shall be interpreted as illustrative only, the invention being limited only by the scope of the appended claims.

We claim:

1. In the process for removing dissolved aluminate from alkaline chromate leach liquor by acidification of the leach liquor to precipitate alumina hydrate, the improvement which comprises, in combination: (a) passing the leach liquor sequentially through a series of at least two agitated vessels; (b) maintaining the liquor at a temperature of at least about 90°C.; and (c) adding acidifying agent to said vessels in amount sufficient to establish gradually decreasing pH levels in the liquor from vessel to vessel in the direction of liquor flow such that the pH in the vessel through which the liquor passes first is maintained within the range of from 10 to 13.5, and the pH in the vessel through which the liquor passes last is maintained within the range of from 6 to 9.5, so that the precipitated alumina hydrate comprises predominantly alumina trihydrate.

2. The improvement of claim 1 wherein the liquor is maintained at a temperature of at least about 100°C.

3. The improvement of claim 2 wherein the pH in the vessel through which the liquor passes first is maintained within the range of from 12 to 13, and the pH in the vessel through which the liquor passes last is maintained within the range of from 9 to 9.5.

4. The improvement of claim 1 wherein the alkaline chromate leach liquor is a sodium chromate leach liquor and the acidifying agent is a sodium bichromate solution.

5. The improvement of claim 4 wherein the liquor is maintained at a temperature of at least about 100°C.

6. The improvement of claim 4 wherein the pH in the vessel through which the liquor passes first is maintained within the range of from 12 to 13, and the pH in the vessel through which the liquor passes last is maintained within the range of from 9 to 9.5.

7. The improvement of claim 6 wherein the acidifying agent is a sodium bichromate solution containing from about 5 to about 40 percent by weight of bichromate, expressed as $Na_2Cr_2O_7.2H_2O$.

8. The improvement of claim 7 wherein the liquor is maintained at about its atmospheric pressure boiling point.

9. The improvement of claim 8 wherein alumina trihydrate is added to the liquor as seed in amount of from 1 to 10 percent by weight, based on the weight of the liquor.

10. the improvement of claim 9 wherein the average overall residence time of the liquor within the vessels is from about 4 to about 12 hours.

* * * * *